C. R. HEBERLING & A. H. LOW.
PORTABLE GENERATOR FOR PRODUCING RADIO ACTIVITY IN VARYING SUBSTANCES.
APPLICATION FILED MAR. 23, 1914.
1,149,829.
Patented Aug. 10, 1915.
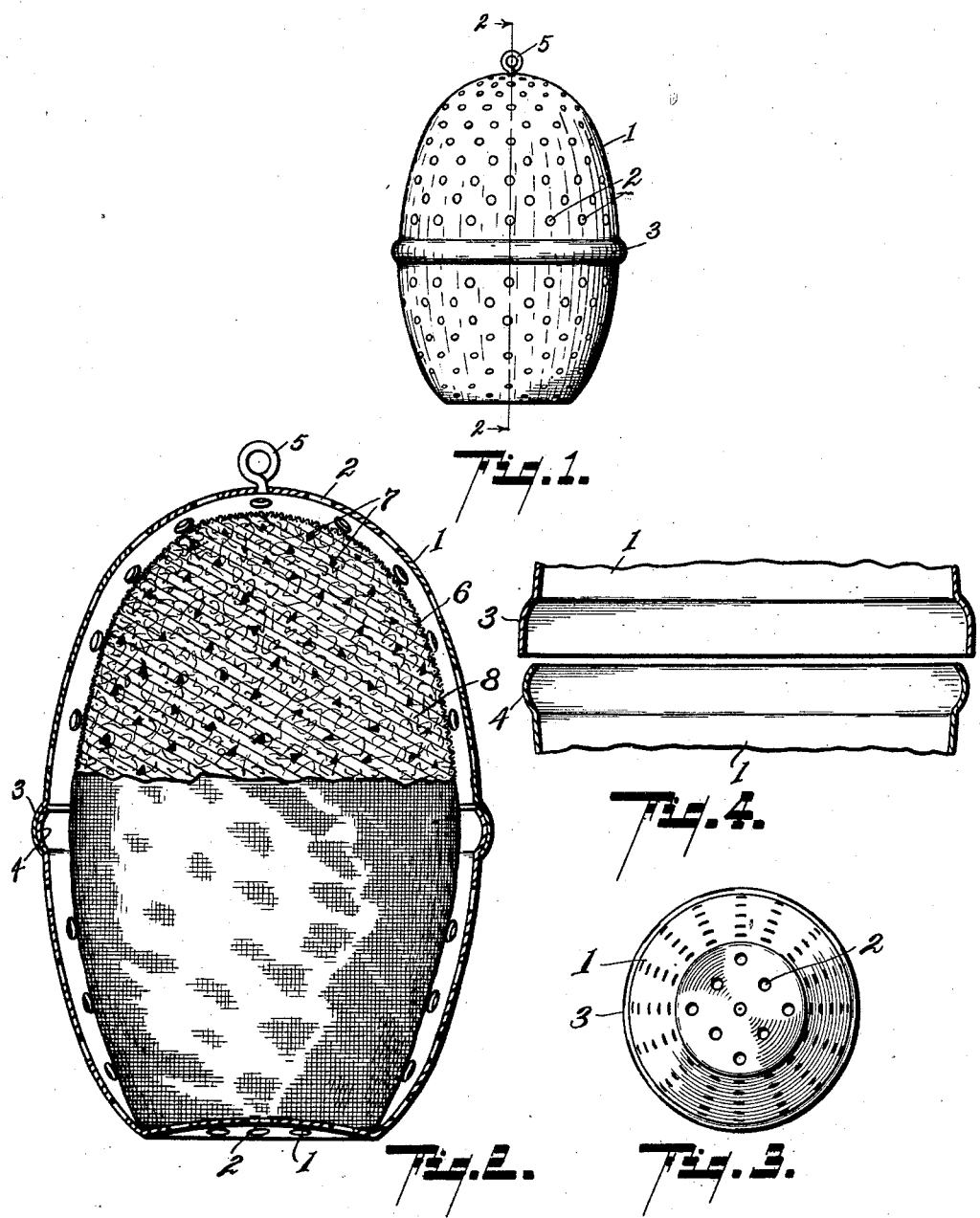

UNITED STATES PATENT OFFICE.

CASSIUS R. HEBERLING AND ALBERT H. LOW, OF DENVER, COLORADO, ASSIGNORS TO THE COLORADO RADIUM PRODUCTS COMPANY, OF DENVER, COLORADO, A CORPORATION OF COLORADO.

PORTABLE GENERATOR FOR PRODUCING RADIO-ACTIVITY IN VARYING SUBSTANCES.

1,149,829. Specification of Letters Patent. Patented Aug. 10, 1915.

Application filed March 23, 1914. Serial No. 826,770.

*To all whom it may concern:*

Be it known that we, CASSIUS R. HEBERLING and ALBERT H. LOW, citizens of the United States, residing at the city and county of Denver and State of Colorado, have invented certain new and useful Improvements in Portable Generators for Producing Radio-Activity in Varying Substances; and we do hereby declare the following to be a full, clear, and exact description of the invention, such as will enable others skilled in the art to which it appertains to make and use the same.

This invention relates to a portable generator for producing radio-activity in varying substances.

The invention itself is for a portable container adapted to hold in captivity a suitable insoluble radium-containing agent or substance, which portable container is adapted to be brought into proximity with, or preferably surrounded by, the substance to be radio-actively impregnated, whereby the emanation of said radium-containing agent is caused to impregnate the substance to be treated, whether a solid, a fluid or gaseous substance, or a liquid, preparing the same for the various uses to which it may be put, and, as the invention is for the generator itself, the invention is not specifically limited to any substance which is now known may be beneficially made radio-active, or which may hereafter become so known.

For the purpose of simplicity of disclosure, however, the invention will only be described especially with reference to fluids, and particularly water, or other liquids, but it will be understood that the invention is not limited to such particular use. With reference to water, for instance, it is now well understood by the medical profession and laymen that the same may be made radio-active, and act as a curative means both for internal and external use.

It is a well known fact that liquids, or substances which have been rendered radio-active, rapidly lose this quality when removed from the source of radio-activity. Natural radio-active waters from mineral springs, for instance, rapidly deteriorate when stored, or shipped away for later or distant consumption.

One of the main advantages, therefore, of the herein described invention, is that, when the portable container is placed in proximity with, or surrounded by, the substance to be impregnated, or particularly when placed in water, or other suitable liquid, it not only renders the latter radio-active but maintains the radio-activity thus produced and prevents its deterioration indefinitely as long as the portable container is so associated with the substance being treated. It will readily be seen, therefore, that it is a very desirable end to invent a portable means that is capable of producing this radio-active effect and which is practically indestructible and capable of being readily sold and shipped to different points for local use, as may be desired. For instance, with a container of simple construction, as hereinafter described, the same may be placed in a receptacle or a glass jar filled with water, or other liquid, and allowed to stand for a sufficient length of time, ordinarily at least over night, and the jar having been closed, the emanation from the radium-containing substance impregnates the liquid with radio-activity and the same may be used with the same results as if the user journeyed to some of the famous radio-active springs or waters, and, while the radio-activity in this liquid will remain a substantial time, it may be caused to continue indefinitely as long as the container is left to remain in the liquid.

It is therefore, one of the objects of this invention to produce such a container, which is simple in construction, cheap to manufacture, and efficient in action.

The invention, however, is not limited to the exact details shown and described, as it is obvious that various modifications might be made in the construction and arrangement of the parts without departing from the spirit of the invention, or without sacrificing any of the vital principles thereof.

For the purpose of disclosure, however, reference is had to the accompanying drawing, showing a practical embodiment of the invention, and the particular features of novelty will be pointed out more succinctly in the claims appended to the following specification.

In the drawing, like characters designate the same parts in the several views, in which—

Figure 1 is an external elevational view of our invention; Fig. 2 is a view on an enlarged scale, showing the external casing in sectional elevation, and showing the internal container for the radium bearing material partly in elevation and partly in sectional elevation; Fig. 3 is a bottom plan view of Fig. 1; and Fig. 4 is a substantially central fragmentary sectional view of the external casing, disassembled and in position to be spun together.

1 designates an external two-part casing of any suitable shape, and composed of any suitable material, such as aluminum, or hard rubber, or other non-corrosive metal or disintegrable or deleterious material, which casing is provided with a plurality of small apertures or perforations 2, preferably disposed substantially around its entire surface, although the number of perforations is immaterial, provided they are sufficient in number and size to permit of the free circulation or entrance of the liquid to be impregnated into the immersed casing, and the free escape into said liquid of the emanation from the radium-containing material or agent.

In the drawings, however, there is shown a neat, and preferred, construction, substantially oval in contour, of any suitable material, but shown in the drawings as formed of metal, provided with the telescoping flanges 3 and 4, which, when the sections are placed together, in assembled position, are spun together, but it is obvious that any other suitable means of joinder may be employed. The casing may also be provided with any suitable means for suspending it in the receptacle containing the liquid to be radio-actively impregnated, or for lowering it therein and withdrawing it therefrom, and, in the drawings, this means is simply shown as a single eye or cotter member 5, secured to the head or top of the casing. This casing is adapted to receive in a compact mass and restrain the escape of a suitable radium-containing agent, such as a radium-bearing ore, insoluble salts, or a suitable insoluble radium compound, but at the same time to permit of the free escape into the liquid of the emanation therefrom. This is preferably done by providing an internal porous or pervious container sufficiently permeable to allow of the free saturation of the radium-containing agent and the escape therethrough of the emanation generated thereby. It is obvious that this internal container may be in the nature of a sufficiently permeable bag of any suitable cloth or metallic fabric, or, in fact, a sufficiently porous container or foraminous cage of any suitable material, the pores or interstices of which are sufficiently minute to prevent the escape of particles of the radio-active mass contained therein. It is illustrated at 6 in Fig. 2 of the drawings as being partly in elevation and partly in section, the latter to show the restrained contents. Within this internal container 6 is held the captive radium-containing agent, either in its natural state or combined with a suitable base, the two being preferably finely divided or comminuted and intermingled as a compact mass although it may be commingled in larger particles.

For the purpose of illustration, where such intermingled mass is employed, in Fig. 2 of the drawings 7 designates conventionally the radium-containing agent and 8 the material or base mixed therewith.

We do not wish it understood that we limit ourselves to any particular radium-containing agent, for our invention would be equally effective with such substances as insoluble salts, and even certain uranium-radium minerals or ores of foreign origin, such as autunite, thorianite, pilbarite, and possibly other minerals which have not yet, however, been feasibly worked, it is believed, for the commercial extraction of radium.

While we do not restrict ourselves, therefore, to any particular radium bearing substance, still, in practice, we have so far preferred pitchblende and carnotite minerals or ores.

In the actual carrying out of the invention, it is possible to use certain ores *en masse*, without any filling or binder, but a peculiar condition exists in connection with carnotite and perhaps other ores, inasmuch as they are more or less of a clay-like nature, and would tend to discolor the liquid in which they are immersed, and also to gradually escape in small particles into the liquid being impregnated. For this reason, therefore, it is desirable to mix up with such ores a suitable filling in the nature of a binder to hold the particles of ore intact as to form, while, at the same time, allowing the same to be freely and completely saturated by the liquid and give off their radio-active emanation. As a matter of fact, this binder might consist of various materials of a suitable nature, but, up to the present time, we have found it preferable to employ a suitable cementitious substance. This is not really essential in the case of pitchblende ore, but, even with pitchblende and other ores, it is desirable that the same be intermingled with a filling of a freely absorptive nature, such, for instance, as pulp, or a small amount of Portland cement, the object being to enable the entire mass to attain a compact, or even solid, condition, and yet be sufficiently porous throughout, to allow easy access of liquid and escape of emanation.

In assembling the parts, the internal container, with the radium-containing agent, is placed within the two-part casing (although it may be formed of several sections), and the sections then suitably joined together, forming a portable whole.

In the drawings, the joint is shown as described, and is spun together, but it is obvious that other means of joinder might be employed with the same or other material. It is also obvious that the portable article may be made in various sizes for various conditions, and shipped or otherwise sent to the desired destination, and there used without any further attention, excepting by following the method of using same, which, as stated in the beginning of the specification, consists in placing the portable container in the water or other liquid to be impregnated, which water or other liquid may be contained in a jar or other suitable receptacle of any size, depending upon the use to which the liquid is to be put. Upon placing the portable container within the receptacle, the latter is closed and allowed to stand until the liquid will have become sufficiently radio-active,— ordinarily over night, more or less.

Having thus described our invention, what we claim is:—

1. As a completed article of manufacture, a radio-active generator adapted to be immersed in a fluid to be radio-actively impregnated, comprising a casing, a closed container located within said casing, and a radio-active agent confined within said container in a compact mass, said container being permeable to said fluid and to the radiations from said radio-active mass but substantially impenetrable to the escape of particles of said mass, and said casing being perforated to permit of the emission of the emanations from said radio-active mass into said fluid.

2. In a portable radio-active generator for liquids, the combination with an outer casing; of a closed container located internally thereof and adapted to receive and contain a compact mass of a suitable radio-active substance, said closed container being permeable to said liquid but substantially impenetrable to the escape of particles of said inclosed mass, and also being substantially indestructibly unaffected relatively to the action of said liquid, and said outer casing being perforated to permit of the saturation of said radio-active mass and permit of the emission of the emanations therefrom into said liquid, substantially as described.

In testimony whereof, we affix our signatures, in presence of two witnesses.

CASSIUS R. HEBERLING.
ALBERT H. LOW.

Witnesses:
J. S. GIUSTA,
A. W. KIRKPATRICK.